United States Patent [19]

Muchow

[11] Patent Number: 4,558,716

[45] Date of Patent: Dec. 17, 1985

[54] VALVE BODY FOR MULTIPLE VALVE INSERT PACKAGES

[75] Inventor: John D. Muchow, Long Beach, Calif.

[73] Assignee: Hydril Company, Los Angeles, Calif.

[21] Appl. No.: 487,457

[22] Filed: Apr. 22, 1983

[51] Int. Cl.⁴ .............................................. F16K 39/00
[52] U.S. Cl. ................................. 137/269; 137/454.6; 137/215; 138/45; 251/224
[58] Field of Search ...................... 137/215, 269, 454.6; 138/45, 43, 46; 251/224, 222, 205

[56] References Cited

U.S. PATENT DOCUMENTS

| | | |
|---|---|---|
| 631,699 | 8/1899 | Darragh et al. ..................... 137/269 |
| 2,614,795 | 10/1952 | Allen . |
| 2,641,280 | 6/1953 | Fleischhauer . |
| 2,736,204 | 2/1956 | Hill . |
| 2,765,143 | 10/1956 | Best . |
| 2,880,757 | 4/1959 | Campbell . |
| 3,203,266 | 8/1965 | Willis et al. . |
| 3,332,438 | 7/1967 | Abdullaev et al. . |
| 3,521,853 | 7/1970 | Gillis . |
| 3,626,452 | 12/1971 | Winter et al. . |
| 3,648,718 | 3/1972 | Curran ................................ 137/269 |
| 3,748,915 | 7/1973 | Winter et al. . |
| 3,768,775 | 10/1973 | Archer . |
| 4,082,104 | 4/1978 | Keeney .............................. 137/271 |
| 4,180,238 | 12/1979 | Muchow . |
| 4,226,263 | 10/1980 | Muchow . |
| 4,337,788 | 7/1982 | Seger ................................ 137/454.6 |
| 4,356,997 | 11/1982 | Beffano . |
| 4,432,385 | 2/1984 | Legris ................................ 137/271 |

FOREIGN PATENT DOCUMENTS 923872  4/1963  United Kingdom .
2022216 12/1979  United Kingdom .

OTHER PUBLICATIONS

Valve Concepts International, Catalog 829 (Chokes & Valves).
European Patent Office (International Application No. PCT/US84/00544, Apr. 11, 1984.

Primary Examiner—Henry Bennett
Attorney, Agent, or Firm—William W. Haefliger

[57] ABSTRACT

A choke valve apparatus is accommodated to different conditions of fluid flow (to or from a well, for example) by providing multiple flow control packages each having two flow control units, each package being readily connectible in the same valve body.

9 Claims, 8 Drawing Figures

VALVE BODY FOR MULTIPLE VALVE INSERT PACKAGES

BACKGROUND OF THE INVENTION

This invention relates generally to control valves, and more particularly to chokes which serve to dissipate the energy of high pressure fluid, as for example fluid rising from a well.

Choke valves are commonly connected to the well annulus at the well surface to dissipate the energy of high pressure fluid. During drilling, such fluid may entrain small particles including drill cuttings loosened from the underground formation. During well production the produced fluid may consist of petroleum, or gas under pressure, and containing smaller amounts of abrasive. The fluid may under other conditions consist of high pressure steam, as during a period of stem injection into the well to increase hydrocarbon flow. These and other varied conditions of fluid flow require the use of different types of chokes, i.e. choke valves especially adapted to best handle the particular fluids rising from the well.

In the past, it was necessary to disconnect the choke valve including the valve body from the well head riser pipe, and replace it with the different choke valve selected for the type of fluid flow encountered. This required an inventory of several choke valves, at or near the well site, which was relatively expensive. Also, the disconnection and connection of the choke valve bodies from and to the well riser pipes, as well as to and from fluid discharge piping, was time consuming, unwieldy and sometimes dangerous.

SUMMARY OF THE INVENTION

It is a major object of the invention to provide a solution to the above problems and difficulties, and characterized by the elimination of need to disconnect the choke valve body from the riser pipe and discharge pipe each time a different choke valve is to be employed.

Basically, the method of the invention involves accommodating valve apparatus to different flow conditions, and includes the following steps:

(a) providing an axially elongated and tubular valve body having a side fluid inlet port, a fluid outlet port at one end of the body, and a control entrance at the opposite end of the body, there being first attachment structure on the body at a first tubular interior region generally between said ports, and there being second attachment structure on the body at a second tubular region generally between said entrance and said ports, (b) providing multiple flow control packages and sequentially installing said packages into said body via said entrance and removing said packages from said valve body via said entrance, (c) each of said packages including first and second flow control units and said installation including attaching said first unit to said first attachment structure and then attaching said second flow control unit to said second attachment structure so that said units are positioned to control flow passing from the fluid inlet port to the fluid outlet port, (d) said multiple flow control packages being provided to have different flow control unit constructions.

As will appear, the flow control packages take different forms; however, they are each installable in like manner into the valve body and removable in like manner from that body which remains in place with its side inlet connected to the riser pipe at the well head, and its end outlet connected to discharge piping.

The valve apparatus itself basically comprises:

(a) an axially elongated and tubular valve body having a side fluid inlet port, a fluid outlet port at one end of the body, and a control entrance at the opposite end of the body, (b) first attachment structure including first internal threading on the body at a first tubular interior region generally between said ports, said first attachment structure adapted to threadably receive a first flow control unit of a selected flow control package inserted into said body via said entrance, (c) and second attachment structure including second threading on the body at a second tubular region generally between said entrance and said ports, said second attachment structure adapted to receive a second flow control unit of said selected package inserted into said body via said entrance, for retention by said second threading, (d) said second attachment structure also including an internal conical surface on the body between said entrance and said ports, said internal conical surface adapted to receive clamping thereagainst of an external conical surface of the second flow control unit, (e) whereby said first and second flow control units are then positioned to control flow passing from said fluid inlet port to the fluid outlet port.

Further, and as will appear, the internal conical surface on the body is located between the second threading and the body side inlet port; the first internal threading has a root diameter less than the smallest diameter of the internal conical surface; and a retainer ring is provided to have external threading for rotary make-up with the body internal threading for holding the second flow control unit clamped to the body internal conical surface, the retainer ring being easily and quickly removable to permit rapid endwise withdrawal of the flow control units from the valve body, and replacement insertion of other units, best accommodated to the flow conditions encountered.

These and other objects and advantages of the invention, as well as the details of an illustrative embodiment, will be more fully understood from the following description and drawings, in which:

DETAILED DESCRIPTION

Figures 1, 3B, 3C:
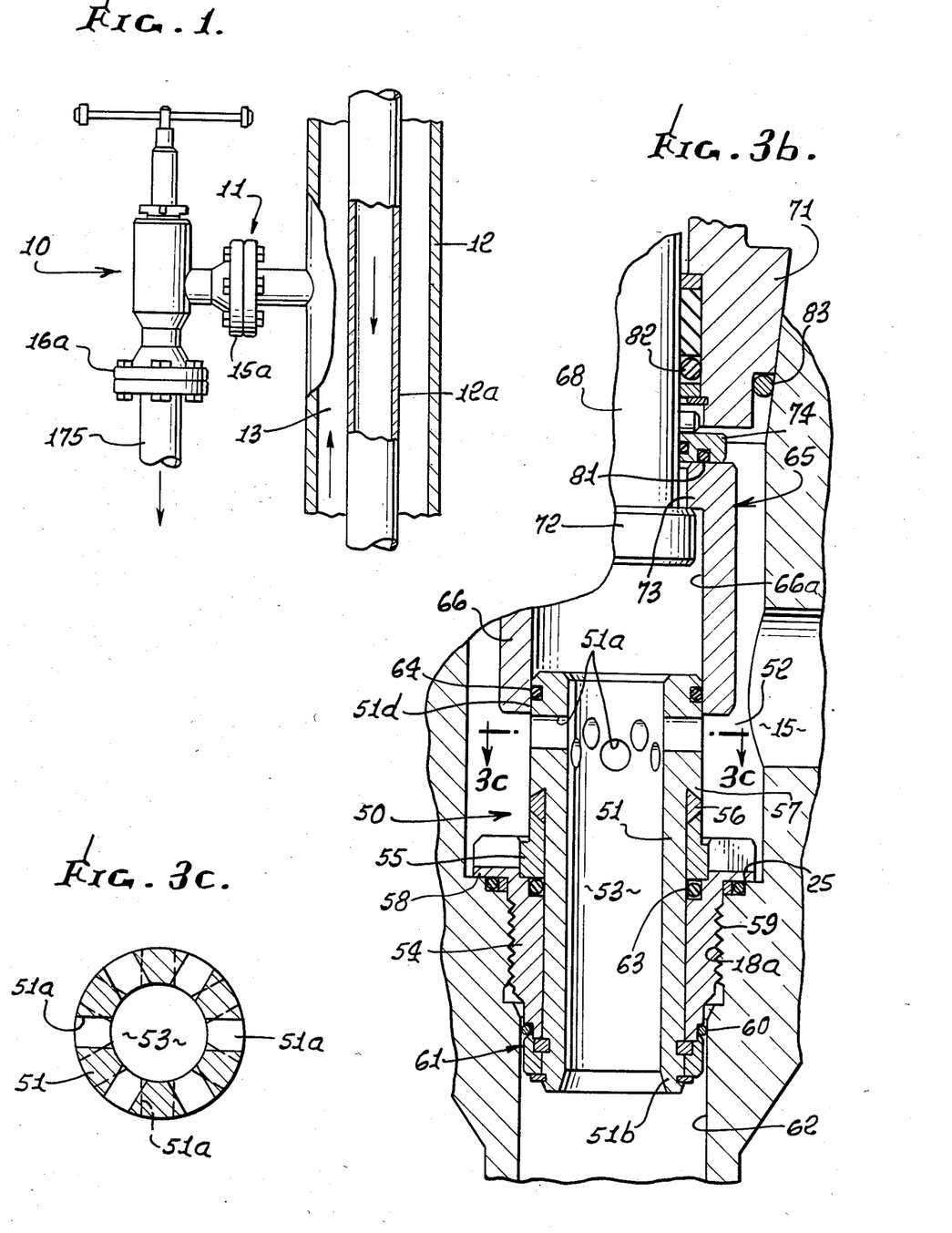
FIG. 1 is an elevation showing a choke valve connected with a well installation.
FIG. 3b is an enlarged view, showing the FIG. 3 valve in open condition.
FIG. 3c is a section taken on lines 3c—3c of FIG. 3b.

Referring first to FIG. 1, a choke valve 10 is shown as sidewardly connected at 11 to well casing 12, to receive pressurized well fluid from the annulus region 13. Examples of such fluid are drilling mud, steam (as produced by secondary recovery steam injection); and oil and gas possibly containing abrasive particulate. Well tubing appears at 12a.

Figure 2:
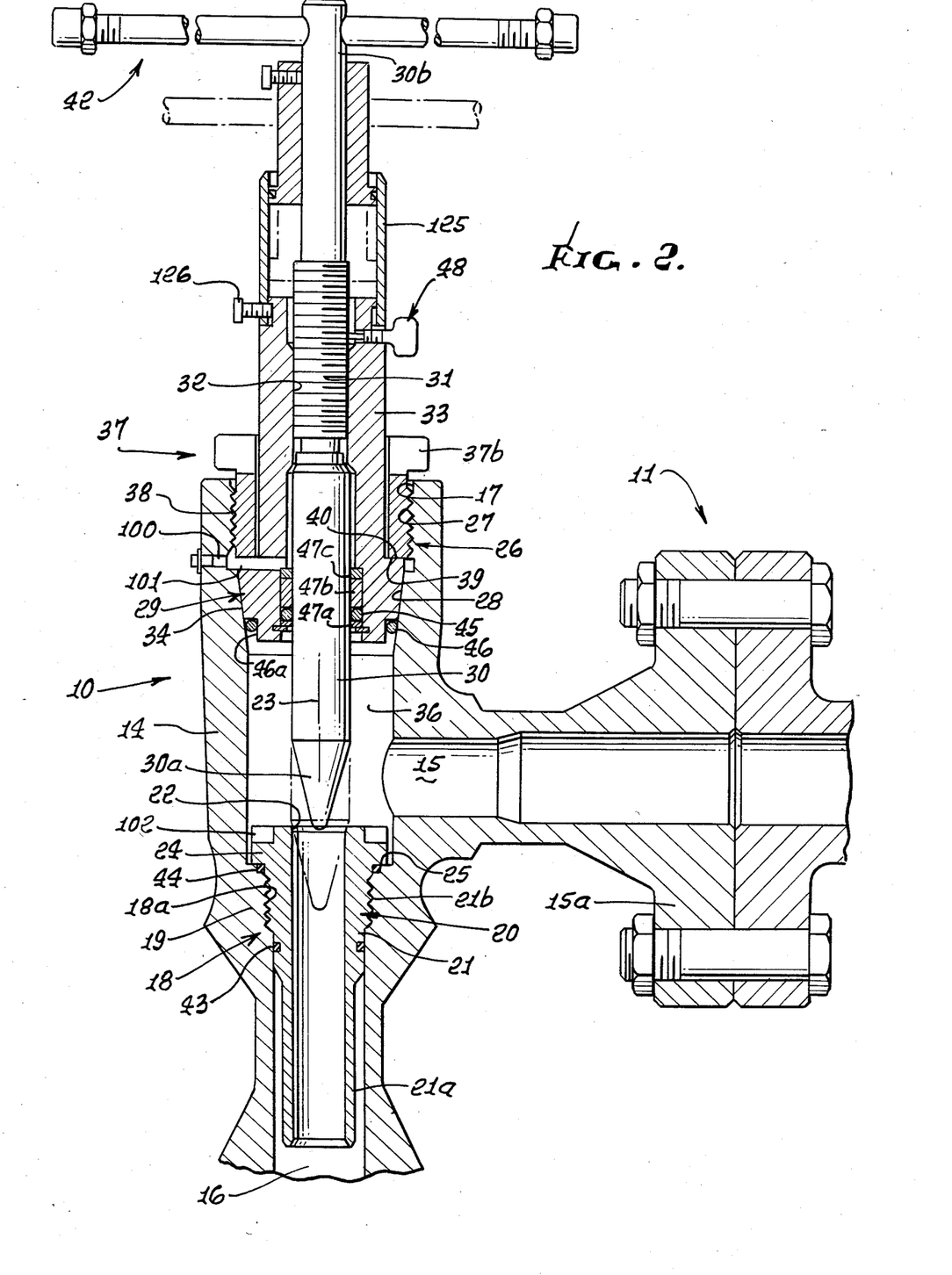
FIG. 2 is an enlarged view, in section, showing the choke valve body, and a first flow control package connected in that body.

Extending the description to FIG. 2, the valve 10 is shown to include an axially elongated tubular body 14 having a side inlet port 15 for well fluid, a fluid outlet port 16 at one end of the body, and a control entrance 17 at the opposite end of the body through which selected control packages are inserted and withdrawn, for adapting the valve to different flow conditions. Ports 15 and 16 have associated flanges 15a and 16a.

Referring to the body itself, it basically includes first attachment structure, designated at 18, located at a first tubular interior region generally between the ports 15 and 16. The structure 18 is shown to include internal threading 18a formed in body wall extent 19, and adapted to receive a first flow control unit 20 of a selected flow control package inserted into the body via entrance 17. As shown, unit 20 comprises a tubular insert 21 having a tubular and frusto-conical seat 22 presented upstream, toward entrance 17, coaxial with respect to axis 23 of the body 14. A flange 24 on the insert engages stop shoulder 25 on the body to position the insert, in response to rotary make-up of external thread 21b on the insert within internal thread 18a. The insert is elongated, and terminates at 21a, near outlet port 16.

Second attachment structure 26 is provided on the body 14, located at a second tubular interior region between entrance 17 and port 15. The second attachment structure is shown to include internal threading 27 near entrance 17, and an internal frusto-conical surface 28 on the body between threading 27 and port 15. (Threadin9 27 may be external, on the body). Structure 26 is adapted to receive a second flow control unit 29 of the selected package inserted endwise into the body via entrance 17, for retention by the second threading. As shown, unit 29 includes a needle or stem 30, and mechanism for moving the needle tapered end 30a axially toward and away from the seat 22, whereby flow through the seat may be controlled. In this regard, stem 30 is externally threaded at 31 for rotary meshing engagement with internal thread 32 on a tubular insert 33, and a handle 42 on the end 30b of the stem is rotatable to advance or retract the stem. Note also thread protective jacket 125 fastened at 126 to insert 33.

Insert 33 has an external frusto-conical surface 34 that seats against corresponding internal surface 28 on the body, axially positioning the insert and the stem in the valve body chamber 36, coaxially with the seat 22. An annular retainer 37 extending about the insert 33 has an the external thread 38 meshing with body thread 27, and a nose 39 engaging shoulder 40 on the insert to clamp the insert in position with conical surfaces 28 and 34 interengaged.

In regard to the above, note annular seals 43–46. Retention elements for seal 45 appear at 47a, 47b and 47c. Seal 46 is retained in recess 46a and against taper 28. Also, a set screw 48 is provided on the insert to engage the stem thread 31 and lock it in position, axially.

When it is desired to change valve control packages, retainer 37 is rotatably removed, and inserts 33 and 21 withdrawn, in sequence, via entrance 17, whereby the described package, that includes units 20 and 29, is removed. That package is adapted to low erosion application, i.e. fluids which contain few if any abrasive particles. A typical example would be hydrocarbon gas, such as methane, containing few if any abrasive particles. Graspable protruding end 37b of the retainer 37 facilitates rapid removal of the retainer. Note also lubricant porting 100 and 101. Flange 24 on insert 20 has notches 102 for reception of a tool to rotatably advance or retract that insert.

Figure 3:
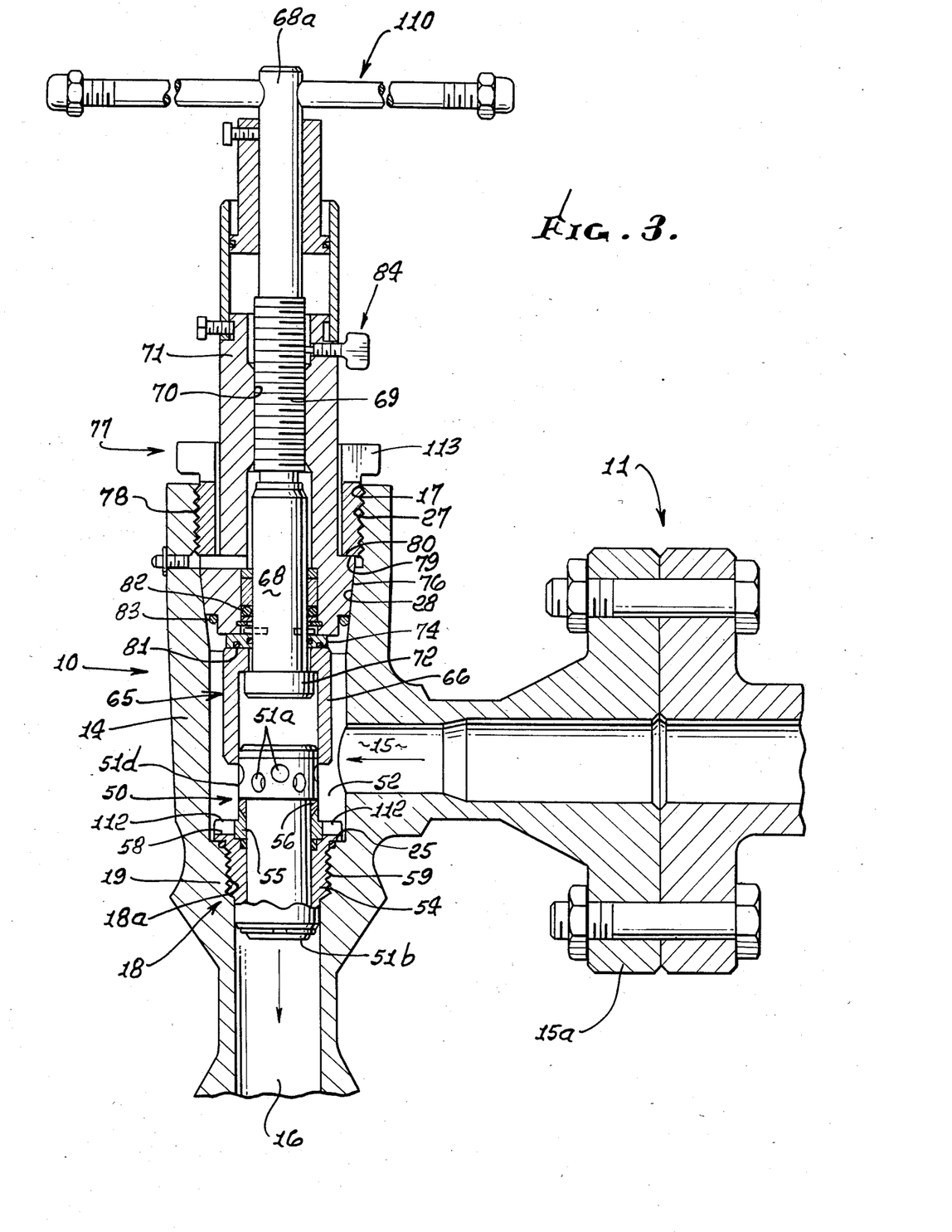
FIG. 3 is a view like FIG. 2, but showing a second flow control package connected in that body.
Figure 3A:
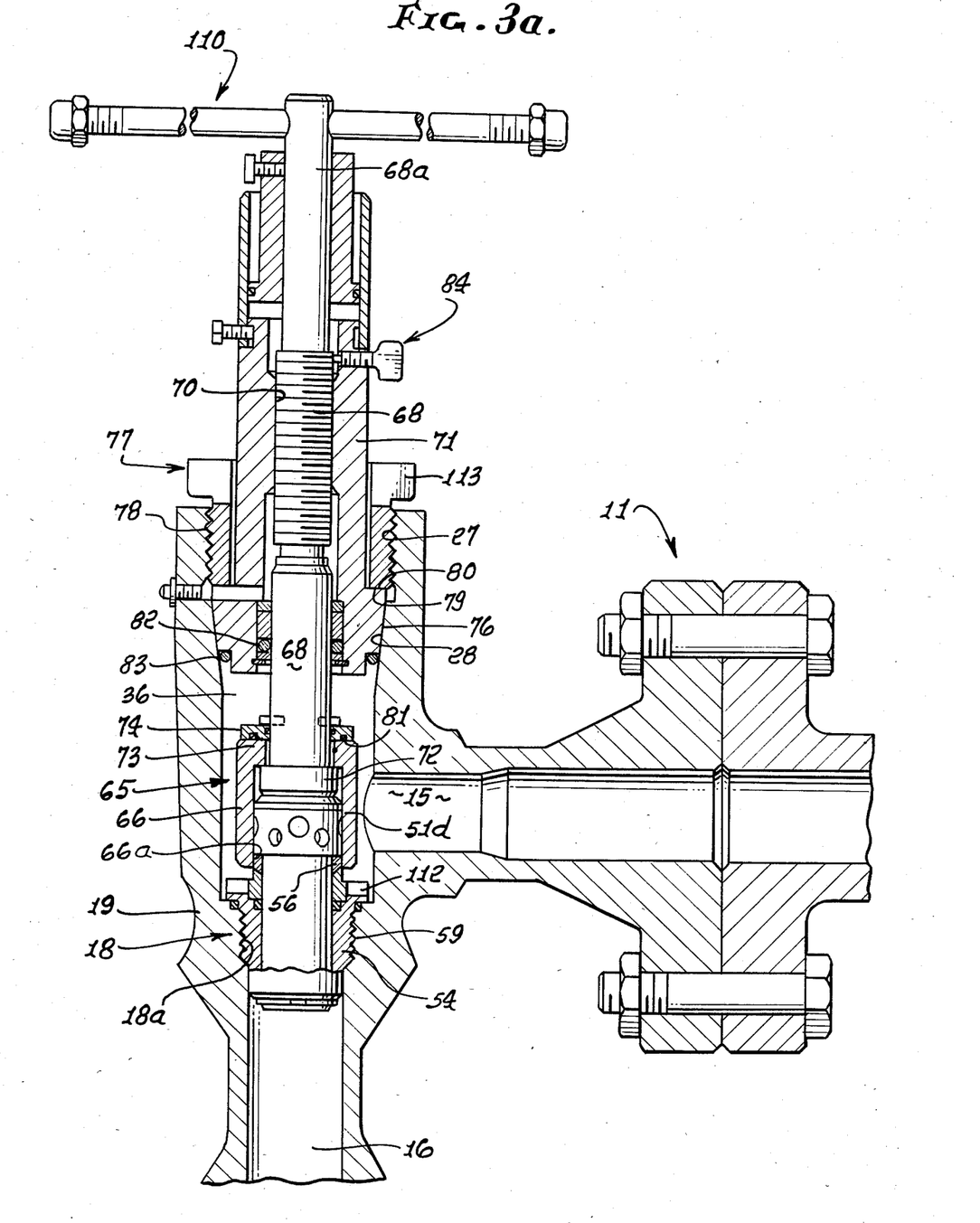
FIG. 3a is a view like FIG. 3, showing the valve closed.

Referring now to FIGS. 3, 3a and 3b, the same body 14 is shown receiving a first flow control unit 50 of another selected valve control package inserted into the body via entrance 17. As shown, unit 50 comprises a first tubular sleeve 51 with side wall through openings 51a for controllably passing well fluid from the exterior 52 of the sleeve to the sleeve bore 53. The sleeve is carried by a tubular insert 54, there being annular mounting ring 55 positioned between a flange 56 on the sleeve and a flange 58 on the insert. Flange 58 engages stop shoulder 25 on the body to position the insert in response to rotary make-up of external thread 59 on the insert within internal thread 18a. The insert is elongated, and the sleeve end 51b remote from flange 58 protrudes from the insert, as shown, and a seal 60 on the insert, retained at 61, engages the body bore 62. Note also seals 63 and 64. In closed position, seal 56 is pressurized axially to seal against bore 66a of sleeve 66, as shown in FIG. 3a.

A second flow control unit 65 of the selected package is inserted endwise into the body via entrance 17, for retention by the second threading 27. As shown, unit 65 includes the above referenced second tubular sleeve 66, together with mechanism for moving that sleeve axially in telescopic relation with the first sleeve 51 to control flow through openings 51a and sleeve bore 53. In the example, sleeve 66 has a bore 66a in sliding interfit with the cylindrical surface 51d of sleeve 51. In this regard, the sleeve 66 is carried at the end of a stem 68 which is externally threaded at 69 for meshing engagement with internal thread 70 on tubular insert 71; and a handle 110 on the end 68a of the stem is rotatable to advance or retract the stem. Note also the external flange 72 on the end of the stem engaging one end of the internal flange 73 on the sleeve 66, and the retainer ring 74 on the stem engaging the opposite end of the flange 73.

Insert 71 has an external frusto-conical surface 76 that seats against corresponding internal surface 28 on the body, axially positioning the insert and the stem in the valve body chamber 36, coaxially with the sleeve 66. An annular retainer 77 extending about the insert 71 has an the external thread 78 meshing with body thread 27, and a nose 79 engaging shoulder 80 on the insert to clamp the insert in position, with conical surfaces 28 and 76 interengaged.

In the above, note annular seals 81–83. Also, a set screw 84 is provided on the insert 71 to engage stem thread 69 to lock that thread, the stem, and sleeve 66 in position, axially.

When it is desired to change valve control packages, retainer 77 is rotatably removed and inserts 71 and 54 withdrawn in sequence via entrance 17. This package (FIG. 3) is especially adapted for control of liquid flow, as for example petroleum, and at the end of drilling operations, i.e. "clean-up", prior to production of a well. Note tool graspable shoulders 112 and 113 on insert 54 and retainer 77.

Figure 4:
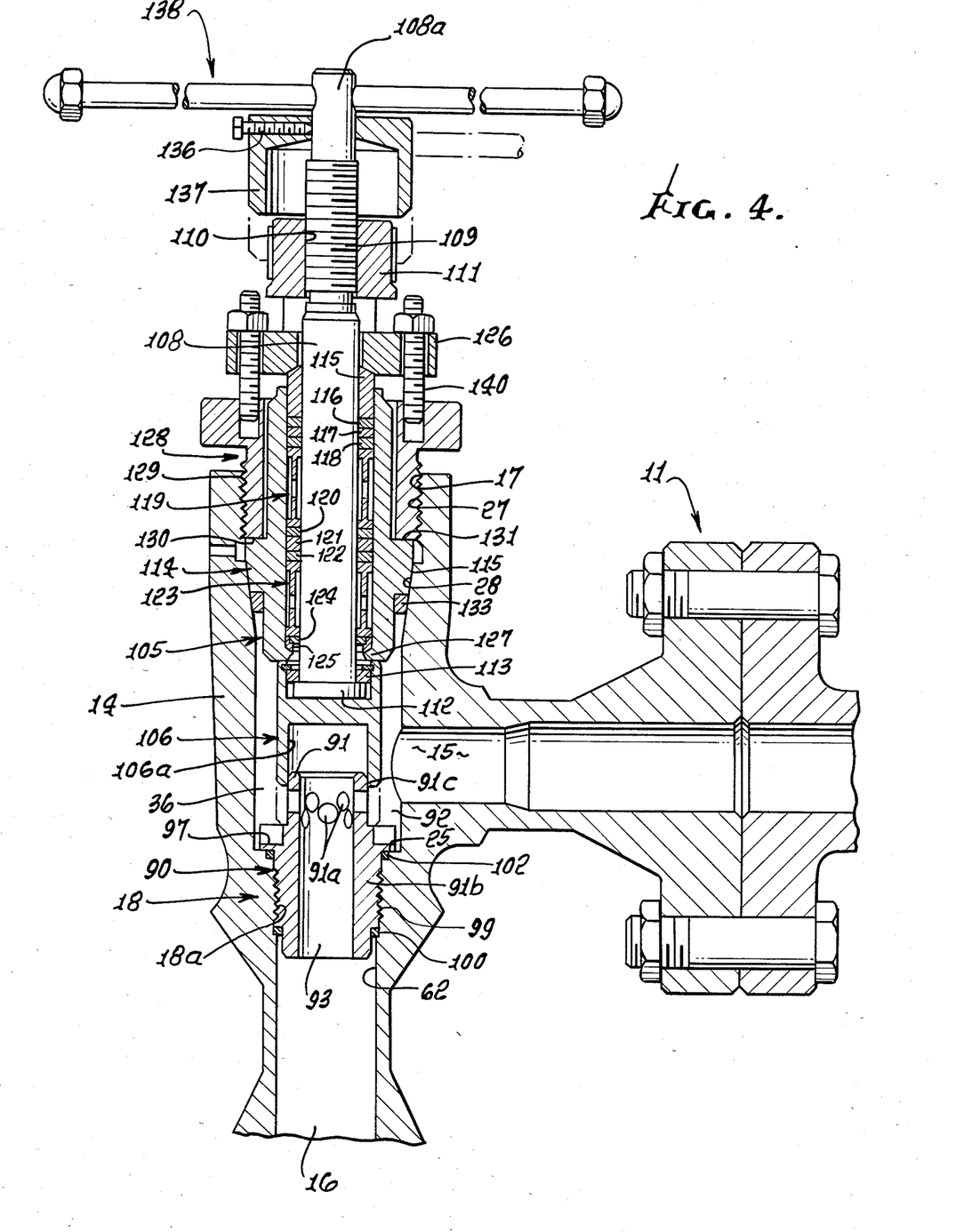
FIG. 4 is another view like FIG. 2, illustrating a third flow control package installed in the valve body.

Referring now to FIG. 4, the same body 14 is shown receiving a first flow control unit 90 of yet another selected valve control package inserted into the body via entrance 17. As shown, unit 90 comprises a first tubular sleeve 91 with side wall through openings 91a for controllably passing well fluid from the exterior 92 of the sleeve to the sleeve bore 93. The sleeve includes a tubular insert portion 91b positioned between a flange 97 on that insert portion and outlet port 16. Flange 97 engages stop shoulder 25 on the body to position the sleeve in response to rotary make-up of external thread 99 on the insert within internal thread 18a. The insert is elongated, and the sleeve 91 protrudes into chamber 36 from the insert, as shown. A seal 100 on the insert engages the body bore 62. Note also seal 102.

A second flow control unit 105 of the selected package is inserted endwise into the body via entrance 17, for retention by the second threading 27. As shown, unit 105 includes a second tubular sleeve 106, together with mechanism for moving that sleeve axially in telescopic relation with the first sleeve 91 to control flow through openings 91a. In the example, sleeve 106 has a bore 106a in sliding interfit with the cylindrical surface 91c of sleeve 91. In this regard, the sleeve 106 is carried at the end of a stem 108 which is externally threaded at 109 for meshing engagement with internal thread 110 on tubular yoke 111; and a handle 138 on the end 108a of the stem is rotatable to advance or retract the stem. Note also the external flange 112 on the end of the stem engaging one end of the retainer ring 113 on the sleeve 106.

An insert 114 has an external frusto-conical surface 115 that seats against corresponding internal surface 28 on the body, axially positioning the tubular insert 114, the stem 108 and the sleeve 106 in the valve body chamber 36, coaxially with the sleeve 91. Yoke 111 is positioned axially relative to the insert 114 by retainer 128 (integral with yoke 111) and stuffing box seal elements 115-125 located axially between the collar and flange 127 on insert 114 are compressed by adjustable flange 126. The annular retainer 128 extending about the insert 114 has on the external thread 129 meshing with body thread 27, and a nose 130 engaging flanged shoulder 131 on the insert to clamp the insert in position with conical surfaces 28 and 115 interengaged. Removable and adjustable fasteners 140 retain part 126 to the retainer, to adjust the axial compression exerted on seal elements 115-125. Note also seal ring 133 on insert 114 and engaging surface 28.

A set screw 136 is provided on a thread protector collar 137 to engage stem end 108a to lock the collar 137 and handle 138 to the stem 108.

When it is desired to change the valve control package, retainer 128 is rotatably removed, and inserts 114 and 91 withdrawn in sequence via entrance 17. Removal of retainer 114 also removes stem 108 and sleeve 106. This package (FIG. 4) is especially adapted for control of steam flow, as for example during secondary recovery of petroleum from oil wells, the steam being injected into the well through the choke, as via ports 15 and 16 in sequence.

Figure 5:
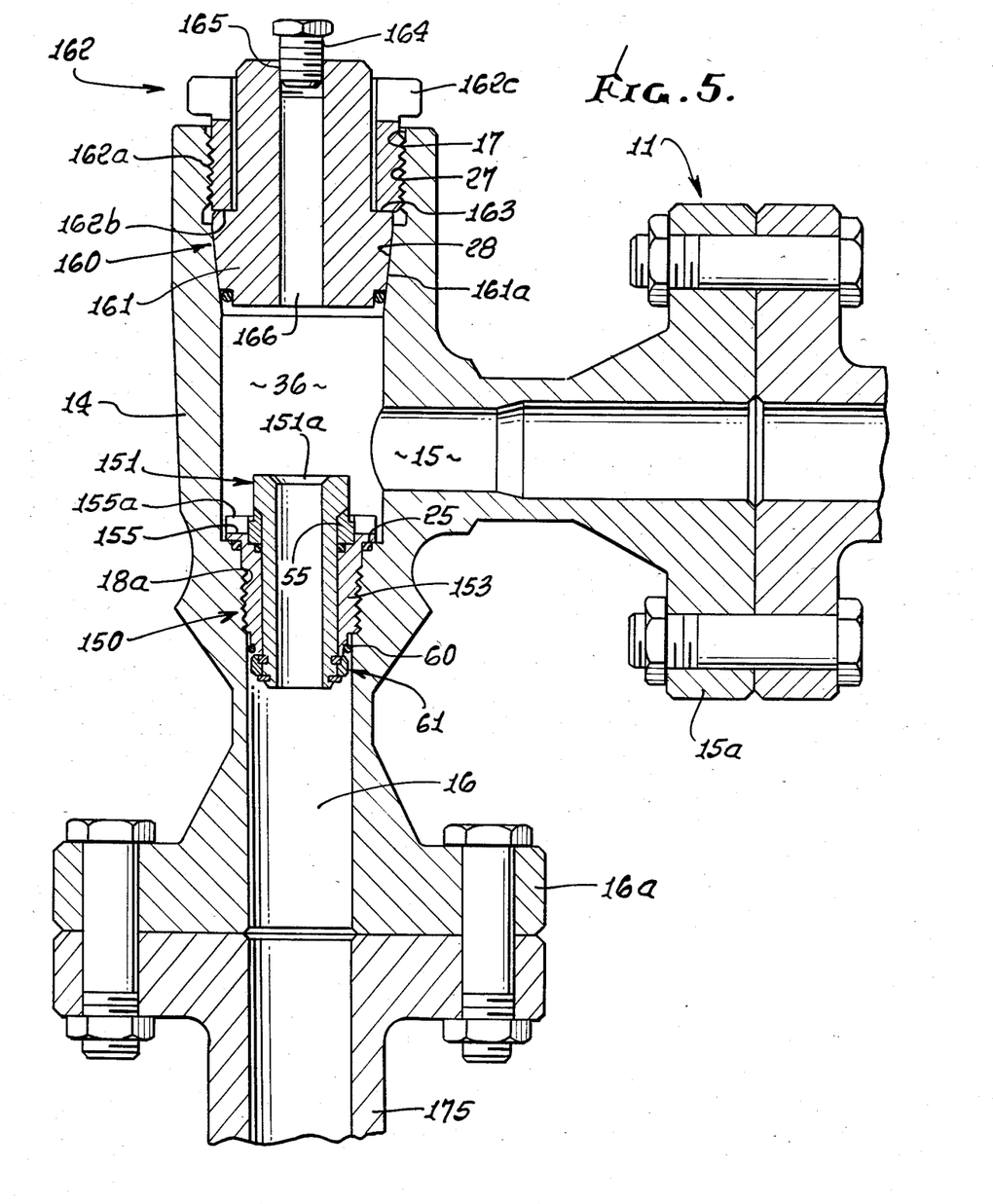
FIG. 5 is yet another view like FIG. 2, showing a fourth flow control package installed in the valve body.

Referring finally to FIG. 5, body 14 is shown receiving a first flow control unit 150 of a further selected valve control package inserted into the body via entrance 17. Unit 150 comprises a tubular part 151 in the form of a flow bean, having an entrance end 151a for controllably passing well fluid from the inlet 15 to outlet 16, via chamber 36. Tubular part 151 is carried by a tubular insert 153, and elements 55, 56, 60 and 61 correspond to those shown in FIG. 3b. A flange 155 on the insert 153 engages stop shoulder 25 on the body, to axially position the insert, and part 151, in response to rotary make-up of exterior thread 156 on the insert within internal thread 18a. Flange 155 is notched at 155a for reception of a tool, inserted via entrance 17, for rotatably advancing or retracting the insert.

The tubular part 151 protrudes beyond the insert, in both axial directions to protect the metallic insert from abrasive wear. Part 151 typically consists of wear resistant material, as for example silicon carbide, and it may become abraded substantially over time by abrasive particles in the flow, without damage to insert 153.

A second flow control unit 160 includes a plug 161 closing entrance 17. Plug 161 has a conical surface 161a engaging body conical surface 28, and a retainer 162 clamps the plug in position, with sealing and centering surfaces 161a and 28 interengaged. Retainer 162 has external thread 162a made-up to body thread 27, and has a protruding nut end 162c accessible exteriorly for retainer turning purposes. A nose 162b on the retainer engages flanged shoulder 163 on the plug to urge the latter downwardly, as shown. A closure 164 has threaded fit at 165 with the plug to close axial opening 166 therethrough. Opening 166 serves as an access port, as for pressure gages, or bleeder valves. The FIG. 5 package is useful for non-changing flow control "choke" requirements, and is inexpensive.

It will be noted in the above figures, that the first threading 18a has a root diameter less than the smallest diameter of conical surface 28; and that the largest diameter of surface 28 is less than the thread internal tip diameter of the second threading 27. As a result, the different flow control packages can easily be inserted into the valve body via entrance 17, and withdrawn for replacement or for substitution of other packages. Note also the discharge piping 175 downward of port 16.

I claim:

1. In valve apparatus adapted to use with different flow control packages each of which includes first and second flow control units for controlling different flow conditions, the combination comprising
   (a) an axially elongated and tubular valve body having a side fluid inlet port, a fluid outlet port at one end of the body, and control entrance at the opposite end of the body,
   (b) first attachment structure including first internal threading on the body at a first tubular interior region generally between said ports, said first attachment structure adapted to threadably receive a first flow control unit of a selected flow control package inserted into said body via said entrance,
   (c) and second attachment structure including second threading on the body at a second tubular region generally between said entrance and said ports, said second attachment structure adapted to receive a second flow control unit of said selected package inserted into said body via said entrance, for retention by said second threading,
   (d) said second attachment structure also including an internal conical thread free surface on the body between said entrance and said ports but closer to said ports than said second threading, said internal conical threed a free surface adapted to receive clamping thereagainst of an external conical thread free surface of the second flow control unit, said first and second internal threading and said internal conical surface having a common central axis, said first internal threading being closer to said axis than each of said second internal threading and said conical surface, (e) whereby said first and second flow control units are then positioned to control flow passing from said fluid inlet port to the fluid outlet port.

2. The combination of claim 1 including said selected flow control package wherein said first flow control unit is attached to said first threading and said second flow control unit is attached to said second threading and clamped to said interior conical surface.

3. The combination of claim 2 wherein said first flow control unit includes a tubular seat and said second flow control unit includes a needle and mechanism for moving the needle axially toward and away from the seat.

4. The combination of claim 2 wherein said first flow control unit includes a first tubular sleeve with side wall through openings, and said second flow control unit includes a second tubular sleeve and mechanism for moving said second sleeve axially in telescopic relation with said first sleeve to control the flow through said openings.

5. The combination of claim 2 wherein said first flow control unit includes a flow bean consisting of abrasive wear resistant material, and said second flow control unit includes a plug closing said entrance.

6. The combination of claim 1 wherein said first internal threading has a root diameter less than the smallest diameter of said internal conical surface.

7. The combination of claim 1 including a stop shoulder on the body to limit threaded make-up of said first flow control unit to said first internal threading and characterized in that a flow passage defined by said first flow control unit is located between said ports.

8. The combination of one of claims 2-5 including a retainer ring meshing with said second internal threading and holding said second flow control unit clamped to said internal conical surface.

9. The combination of claim 1, including said second flow control unit which includes an elongated insert having a tapered head engageable against said conical surface and a stem projecting from the body, and an annular retainer extending about the stem and having threaded engagement with said second threading to clamp the head in position.

* * * * *